United States Patent
Fujita et al.

(10) Patent No.: US 7,723,933 B2
(45) Date of Patent: May 25, 2010

(54) VEHICULAR GENERATOR-MOTOR CONTROL APPARATUS

(75) Inventors: Masahiko Fujita, Tokyo (JP); Yoshihito Asao, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 90 days.

(21) Appl. No.: 11/651,583

(22) Filed: Jan. 10, 2007

(65) Prior Publication Data

US 2007/0182349 A1 Aug. 9, 2007

(30) Foreign Application Priority Data

Jan. 12, 2006 (JP) ............................. 2006-005094

(51) Int. Cl.
H02P 7/32 (2006.01)
(52) U.S. Cl. .................... 318/145; 318/140; 318/141
(58) Field of Classification Search ................ 318/481, 318/484, 145, 141, 140; 388/911, 912
See application file for complete search history.

(56) References Cited

U.S. PATENT DOCUMENTS

| | | | | |
|---|---|---|---|---|
| 5,739,663 | A * | 4/1998 | Brown | 318/701 |
| 5,844,388 | A * | 12/1998 | Maiocchi | 318/400.12 |
| 5,914,582 | A * | 6/1999 | Takamoto et al. | 318/801 |
| 6,541,939 | B2 * | 4/2003 | Kishibe et al. | 318/799 |
| 6,583,593 | B2 * | 6/2003 | Iijima et al. | 318/400.32 |
| 6,646,407 | B2 * | 11/2003 | Rahman et al. | 318/701 |
| 6,812,660 | B2 * | 11/2004 | Takahashi et al. | 318/400.02 |
| 7,067,998 | B2 * | 6/2006 | Karwath et al. | 318/400.14 |
| 7,071,651 | B2 * | 7/2006 | Toyozawa et al. | 318/807 |
| 7,298,106 | B2 * | 11/2007 | Yamamoto et al. | 318/400.27 |
| 2001/0001227 | A1 * | 5/2001 | Notohara et al. | 318/268 |
| 2005/0001582 | A1 * | 1/2005 | Goto et al. | 318/802 |
| 2005/0275362 | A1 * | 12/2005 | Yamamoto et al. | 318/254 |

FOREIGN PATENT DOCUMENTS

| | | |
|---|---|---|
| DE | 44 04 889 A1 | 8/1995 |
| DE | 197 33 212 A1 | 2/1999 |
| DE | 100 14 626 A1 | 10/2000 |
| DE | 103 19 537 A1 | 12/2003 |
| DE | 695 33 104 T2 | 10/2004 |
| EP | 1 596 494 A2 | 11/2005 |
| JP | 07-222309 A | 8/1995 |
| JP | 08-182380 A | 7/1996 |
| JP | 10-262343 A | 9/1998 |
| JP | 2002-058279 A | 2/2002 |
| JP | 2002-064990 A | 2/2002 |
| JP | 2002-142496 A | 5/2002 |
| JP | 2002-272166 A | 9/2002 |
| JP | 2003-009573 A | 1/2003 |
| JP | 2003-291832 A | 10/2003 |
| JP | 2004-7964 A | 1/2004 |
| JP | 2004-180414 A | 6/2004 |
| JP | 2004-519184 A | 6/2004 |
| JP | 2004-320861 A | 11/2004 |
| WO | WO 02/060711 A1 | 8/2002 |

* cited by examiner

*Primary Examiner*—Bentsu Ro
*Assistant Examiner*—David S Luo
(74) *Attorney, Agent, or Firm*—Sughrue Mion, PLLC (57) ABSTRACT

A vehicular generator-motor control apparatus wherein a winding field type salient-pole generator-motor 1 (in FIG. 1) for a vehicle is subjected to a conduction control by a DC-AC converter 2, characterized in that a stator 1A of the vehicular winding field type salient-pole generator-motor 1 is energized by rectangular wave voltages at those conduction start angles δ of respective phases of the stator 1A which are shifted a predetermined angle relative to a rotor position, and that the conduction start angles δ of the respective phases change substantially continuously in accordance with an input voltage of the DC-AC converter 2 and a revolution speed of the generator-motor 2.

18 Claims, 10 Drawing Sheets

| | PWM SINUSOIDAL WAVE | 120° RECTANGULAR WAVE | 180° RECTANGULAR WAVE |
|---|---|---|---|
| VOLTAGE WAVEFORM | | | |
| VOLTAGE UTILIZATION FACTOR | 0.612 | 0.675 | 0.780 |

VEHICULAR GENERATOR-MOTOR CONTROL APPARATUS

BACKGROUND OF THE INVENTION

1. Field of the Invention

This invention relates to a vehicular generator-motor control apparatus wherein currents are inputted to and outputted from a vehicular generator-motor by a DC-AC converter.

2. Description of the Related Art

JP-T-2004-519184 (FIGS. 2 and 3, and the explanations thereof), for example, adopts a method for controlling a reversible multiphase rotary electric equipment. The method is characterized in that, in actuating as a motor a generator-motor which serves as both a generator and the motor, the electric equipment is driven in accordance with two modes which correspond to different speed/torque characteristic curves, that is, a first mode which is called "starter mode" and in which the thermal engine of an automobile can be driven so as to start the automobile at a low speed and with a large torque, and a second mode which is called "auxiliary motor mode" and in which only the electric equipment, at least one power consumption unit or the thermal engine can be driven at a higher speed and with a smaller torque than in the first mode. Besides, in general, in a case where a PWM sinusoidal wave control is performed, phases are continuously changed in correspondence with a revolution speed by a vector control.

With the prior-art method, a current becomes discontinuous at the changeover of the two modes, and a voltage accordingly becomes discontinuous. Therefore, the torque becomes discontinuous, and the revolution speed does not become smooth.

On account of the discontinuous current, electromagnetic noise suddenly enlarges at the changeover of the two modes, so that an uneasy feeling is incurred.

In a region near the changeover of the two modes, the torque lowers, and the maximum torque is not attained. Therefore, the capability of the motor cannot be exploited to the utmost.

Since the PWM control is performed by turning ON/OFF voltages, a section in which no voltage is used develops, and a voltage utilization factor lowers. Especially a battery for the automobile usually has a voltage of 12 V, and the lowering of the torque is drastic when the voltage utilization factor is low.

In a case where a rotor has non-salient poles, a reluctance torque is not generated even by changing the phases of stator currents, and the phase changes are less effective.

SUMMARY OF THE INVENTION

This invention has been made in view of the circumstances as stated above, and has for its object to enhance a torque.

A vehicular generator-motor control apparatus according to this invention is a vehicular generator-motor control apparatus wherein a winding field type salient-pole generator-motor for a vehicle is subjected to a conduction control by a DC-AC converter. In the control apparatus, a stator of the vehicular winding field type salient-pole generator-motor is energized by rectangular wave voltages at those conduction start angles of respective phases of the stator which are shifted a predetermined angle relative to a rotor position. Besides, the conduction start angles of the respective phases change substantially continuously in accordance with an input voltage of the -DC-AC converter and a revolution speed of the generator-motor. Thus, the control apparatus brings forth the advantage of enhancing a torque.

The foregoing and other objects, features, aspects, and advantages of the present invention will become more apparent from the following detailed description of the present invention when taken in conjunction with the accompanying drawings.

DESCRIPTION OF THE PREFERRED EMBODIMENTS

Embodiment 1

Now, Embodiment 1 of this invention will be described with reference to FIGS. 1-8. Incidentally, throughout the drawings, identical numerals and signs indicate identical portions.

Figure 1:
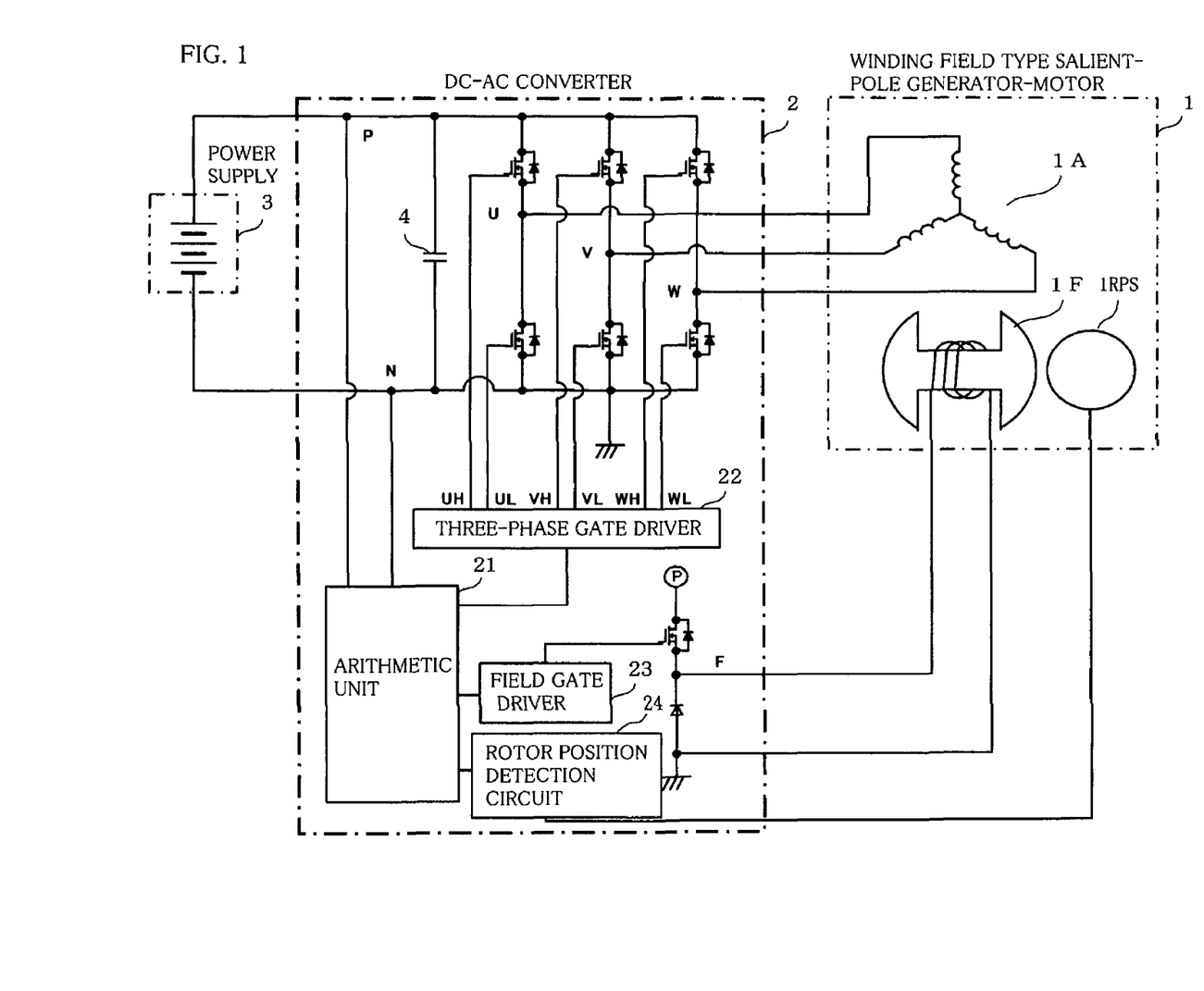
FIG. 1 is a circuit diagram showing an example of the arrangement of a winding field type salient-pole generator-motor and a DC-AC converter in Embodiment 1 of this invention.

FIG. 1 shows a circuit diagram of a winding field type salient-pole generator-motor 1, a DC-AC converter 2 which inputs and outputs currents to and from the generator-motor 1, a DC power supply 3 such as battery, and a smoothing capacitor 4.

The winding field type salient-pole generator-motor 1 includes a stator (usually, armature) 1A having a winding of Y-connection, a rotor (usually, field magnet) 1F having a winding, and a rotor position sensor 1RPS.

The DC-AC converter 2 includes an arithmetic unit 21, a three-phase gate driver 22, a field gate driver 23, and a rotor position detection circuit 24.

The arithmetic unit 21 computes a conduction start angle of each phase of the stator 1A by using a P-N voltage which is the input voltage of the DC-AC converter 2, and that revolution speed of the generator-motor 1 which is calculated from the signal of the rotor position detection circuit 24, and it sends a signal to the three-phase gate driver 22. The three-phase gate driver 22 turns ON/OFF the switching elements (here, MOSFETs) of upper and lower arms in three phases, whereby voltages are applied to UVW terminals, and three-phase currents are caused to flow.

Figure 2:
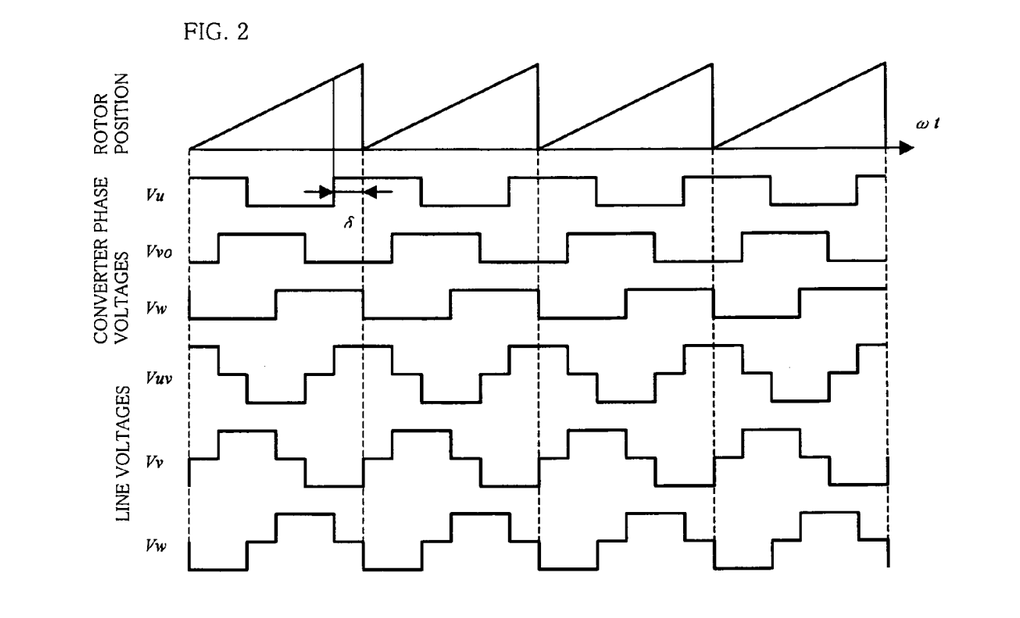
FIG. 2 is a diagram showing a rotor position and examples of the voltage waveforms of 180° rectangular wave conduction in Embodiment 1 of this invention.

FIG. 2 shows a rotor position (ωt) in 180° rectangular wave conduction, and examples of DC-AC converter phase voltages (phase voltages of the stator 1A) Vuo, Vvo and Vwo and line voltage Vuv, Vvw and Vwu. Here, symbol δ denotes a U-phase conduction start angle which is a relative angle to the rotor position.

Figure 3:
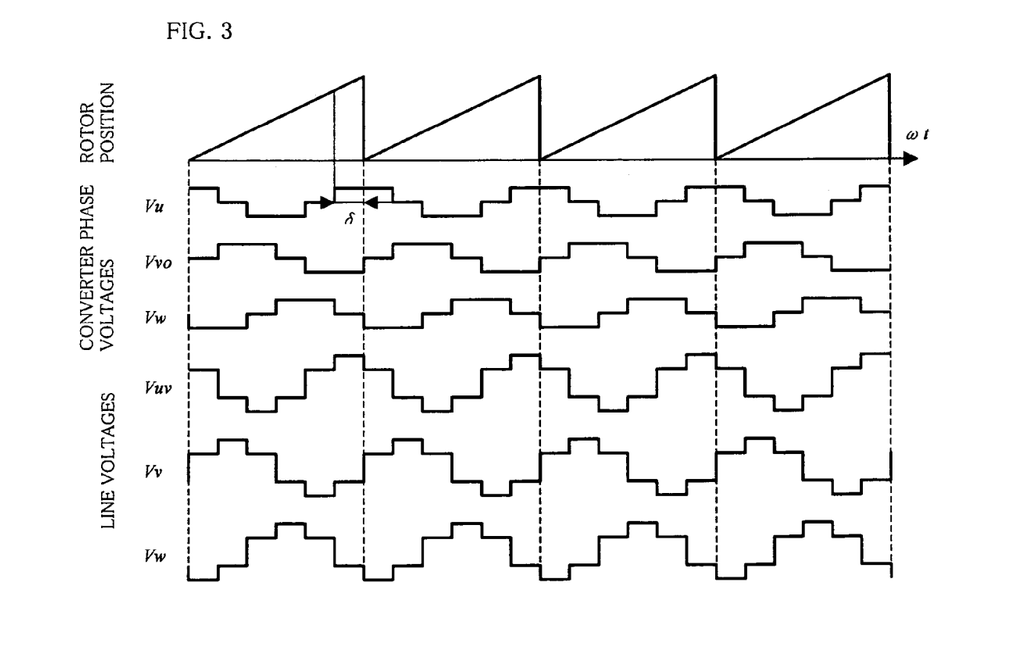
FIG. 3 is a diagram showing a rotor position and examples of the voltage waveforms of 120° rectangular wave conduction in Embodiment 1 of this invention.

FIG. 3 shows a rotor position (ωt) in 120° rectangular wave conduction, and examples of DC-AC converter phase voltages (phase voltages of the stator 1A) Vuo, Vvo and Vwo and line voltage Vuv, Vvw and Vwu. Here, symbol δ denotes a U-phase conduction start angle which is a relative angle to the rotor position.

Figure 4:
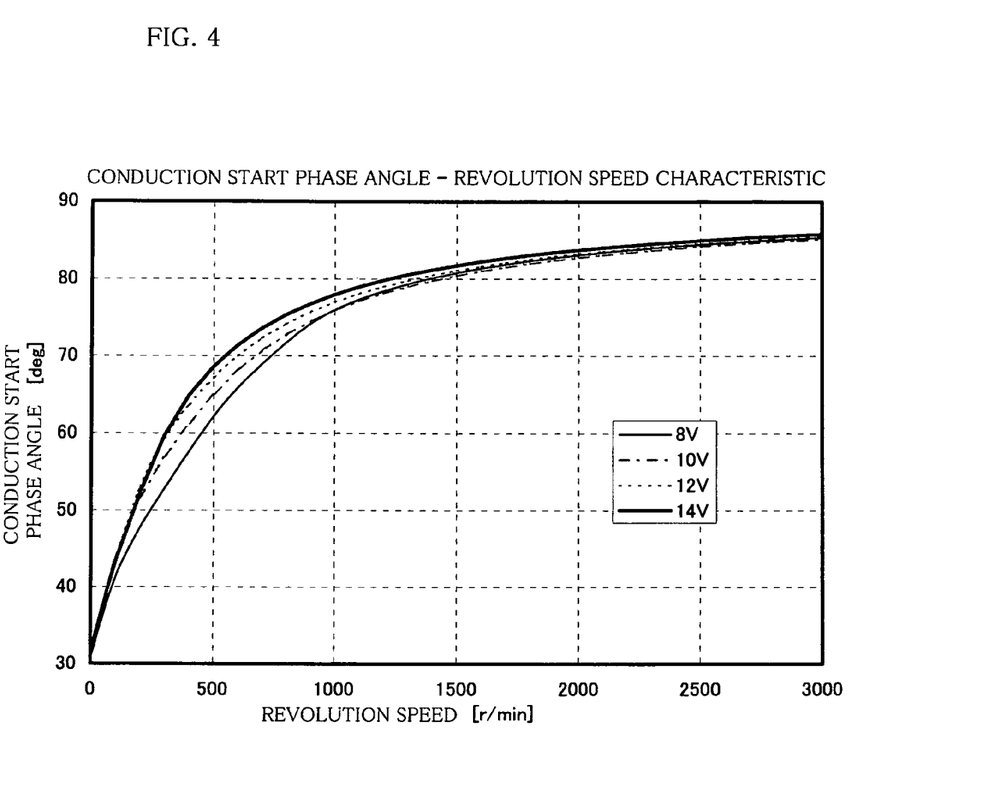
FIG. 4 is a diagram showing examples of the set values of a conduction start phase angle (180° rectangular wave conduction) versus a revolution speed, every input voltage of the DC-AC converter, in Embodiment 1 of this invention.

FIG. 4 shows examples of the set values of a conduction start phase angle (180° rectangular wave conduction) versus the revolution speed, every input voltage of the DC-AC converter. Here, symbol δ denotes the U-phase conduction start angle (relative angle to the rotor position).

Figure 5:
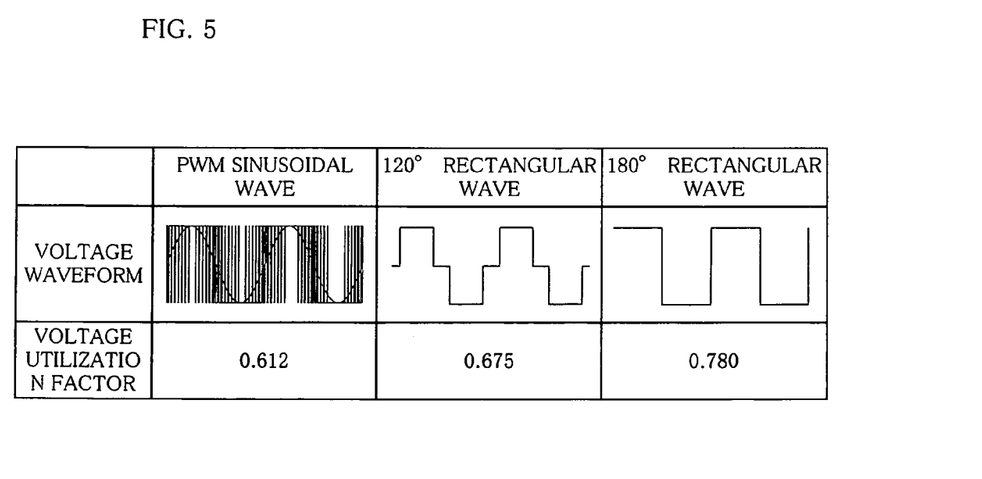
FIG. 5 is a diagram showing examples of the voltage utilization factors of the waveforms of PWM sinusoidal wave conduction and the rectangular wave conductions in Embodiment 1 of this invention.

FIG. 5 shows the waveforms of PWM sinusoidal wave conduction and the rectangular wave conductions, and voltage utilization factors. Since the rectangular wave conduction is enhanced in the voltage utilization factor as compared with the PWM sinusoidal wave conduction, it can increase the currents and can enhance torques. Besides, when the rectangular wave conduction is employed instead of the PWM, a power supply for decreasing a current time constant in a switching mode and a smoothing capacitor 4 of large capacitance for decreasing a surge voltage as are required in the case of the PWM can be replaced with capacitors of small capacitances. In the case of the rectangular wave drive, a switching speed need not be heightened. Therefore, the surge voltage can be decreased by lowering the switching speed, and the capacitor of small capacitance for noise reduction suffices. Accordingly, a cost and a size can be reduced. Besides, owing to the rectangular wave conduction which replaces the PWM switching, a switching loss can be decreased. Assuming, for example, that the PWM is performed at a carrier frequency of 10 kHz, switching operations are effected twice at ON and OFF in 100 μs, that is, once in 50 μs. On the other hand, in a case where the revolution speed is 1000 r/min in the rectangular wave drive and where the rotor 1F has 8 pole pairs, one cycle of the waveform of the rectangular wave voltage is 6500 μs. In this case, switching operations are effected twice at ON and OFF in one cycle, that is, once in 3250 μs. As compared with the PWM, the rectangular wave conduction decreases to 1/65 in the number of times of switching and is capable of conspicuously decreasing the switching loss. Therefore, the efficiency of the DC-AC converter is enhanced, and the torque is also enhanced. Moreover, owing to the decrease of the loss, the heat generation of the switching elements is suppressed, and the reliability thereof is enhanced.

Figure 6:
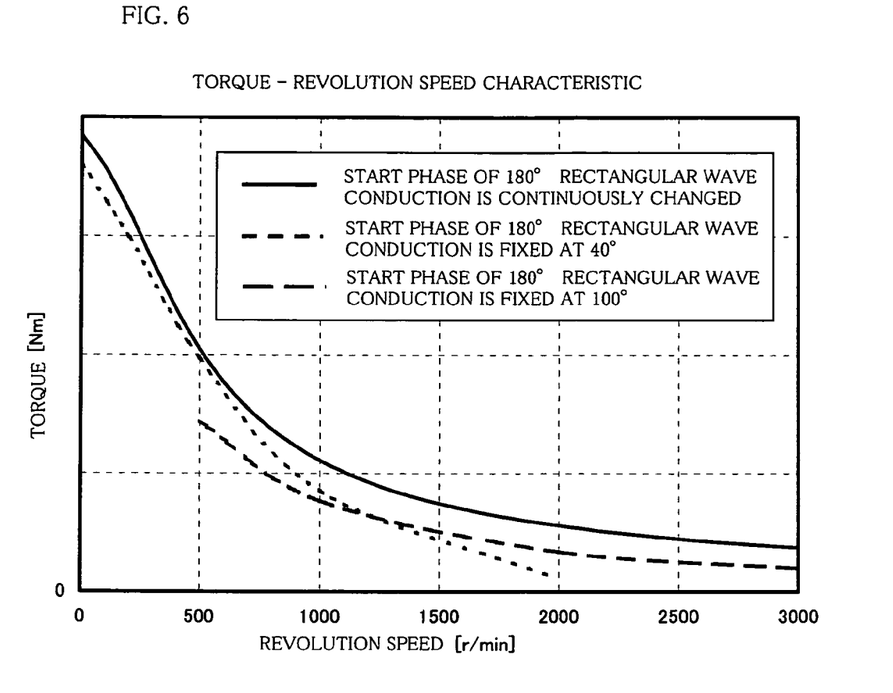
FIG. 6 is a diagram showing examples of the torque characteristics of the 180° rectangular wave conduction in the cases where conduction start angles are fixed and continuously hanged, in Embodiment 1 of this invention.

FIG. 6 shows the torque characteristics of the 180° rectangular wave conduction in the cases where the conduction start angles are two fixed angles shifting 60°, and the case where the conduction start angle is continuously changed. When the angle is continuously changed, the torque is enhanced more, and the torque characteristic is smoothened more than in the cases where the angles are fixed.

Figure 7:
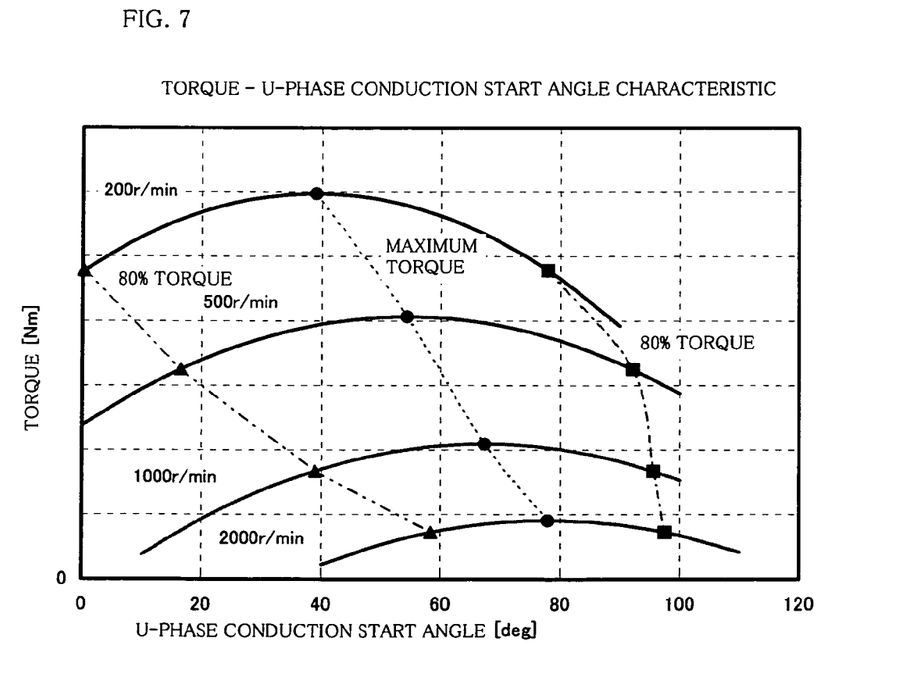
FIG. 7 is a diagram showing examples of the relationship between a U-phase conduction start angle and a torque in Embodiment 1 of this invention.

FIG. 7 shows the relationship between the U-phase conduction start angle and the torque. When the conduction start angle affording the maximum torque is set, the torque becomes the maximum, and when the conduction start angle affording any desired torque, in this example, 80% of the maximum torque is set, the desired torque can be attained.

Figure 8:
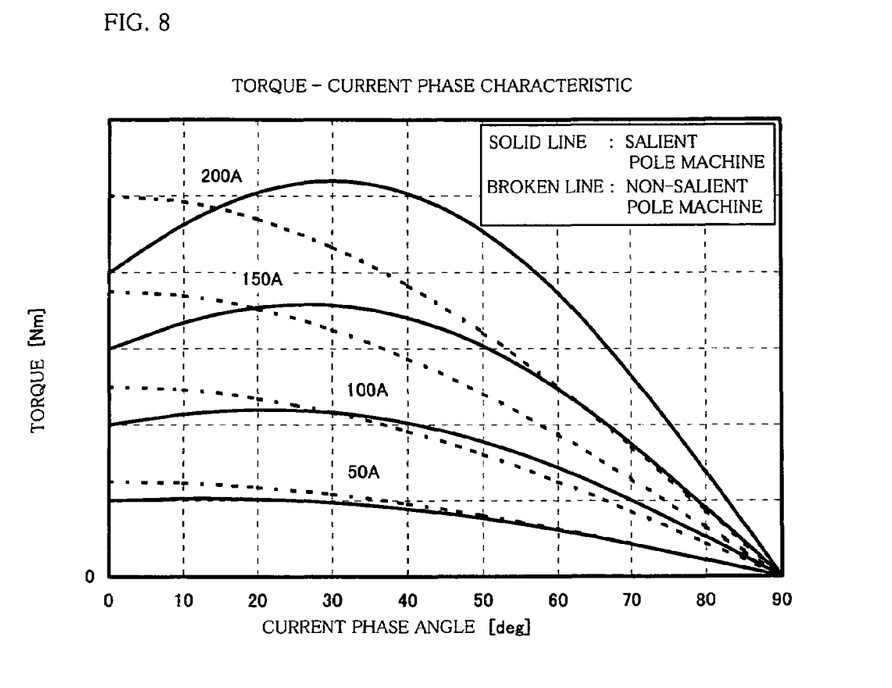
FIG. 8 is a diagram showing examples of the torque characteristics of a salient pole machine and a non-salient pole machine, versus a current phase angle in Embodiment 1 of this invention.

FIG. 8 shows the torque characteristics of a salient pole machine and a non-salient pole machine, versus the current phase angles. The salient pole machine has the maximum value of the torque at the phase angle which is larger, and the phase which exhibits the maximum torque differs depending upon the current. In contrast, the non-salient pole machine has a peak at the zero current phase, and this fact does not differ depending upon the current value. Since an armature reaction voltage which is generated in the stator becomes larger with the revolution speed, the current value of the stator becomes smaller as the revolution speed becomes higher. In the salient pole machine, accordingly, the current phase at which the torque becomes the maximum differs depending upon the revolution speed. Since the current phase can be shifted by changing the conduction start angle of the voltage, the torque can be increased when controlled at the optimum phase.

Embodiment 2

Figure 9:
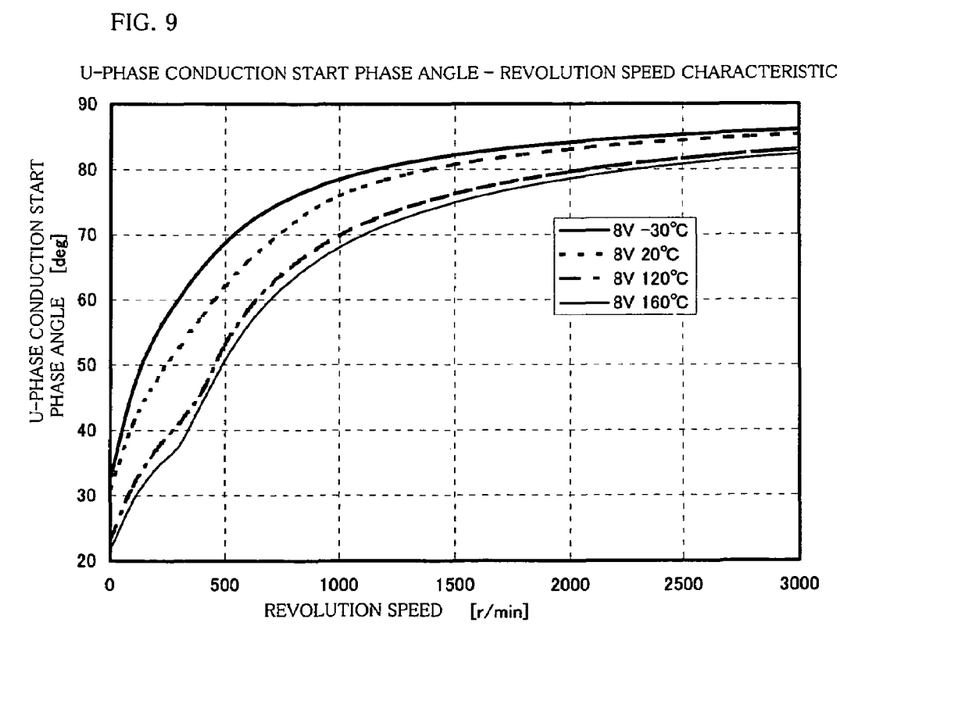
FIG. 9 is a diagram showing examples of the set value change of the U-phase conduction start angle dependent upon the temperature of the stator coil of the generator-motor, in Embodiment 2 of this invention.

Now, Embodiment 2 of this invention will be described with reference to FIG. 9. FIG. 9 shows the set value change of the U-phase conduction start angle dependent upon the temperature of the stator coil of the generator-motor. Thus, the torque can be controlled to the maximum torque or the target torque at each temperature. The temperature of the stator coil may well be substituted by the temperature of the DC-AC converter. Besides, on the occasion of the first engine start at a low temperature, all of the generator-motor, the DC-AC converter and an engine are at substantially equal temperatures, and hence, the conduction start angle may well be set in accordance with the water temperature or oil temperature of the engine.

Embodiment 3

Figure 10:
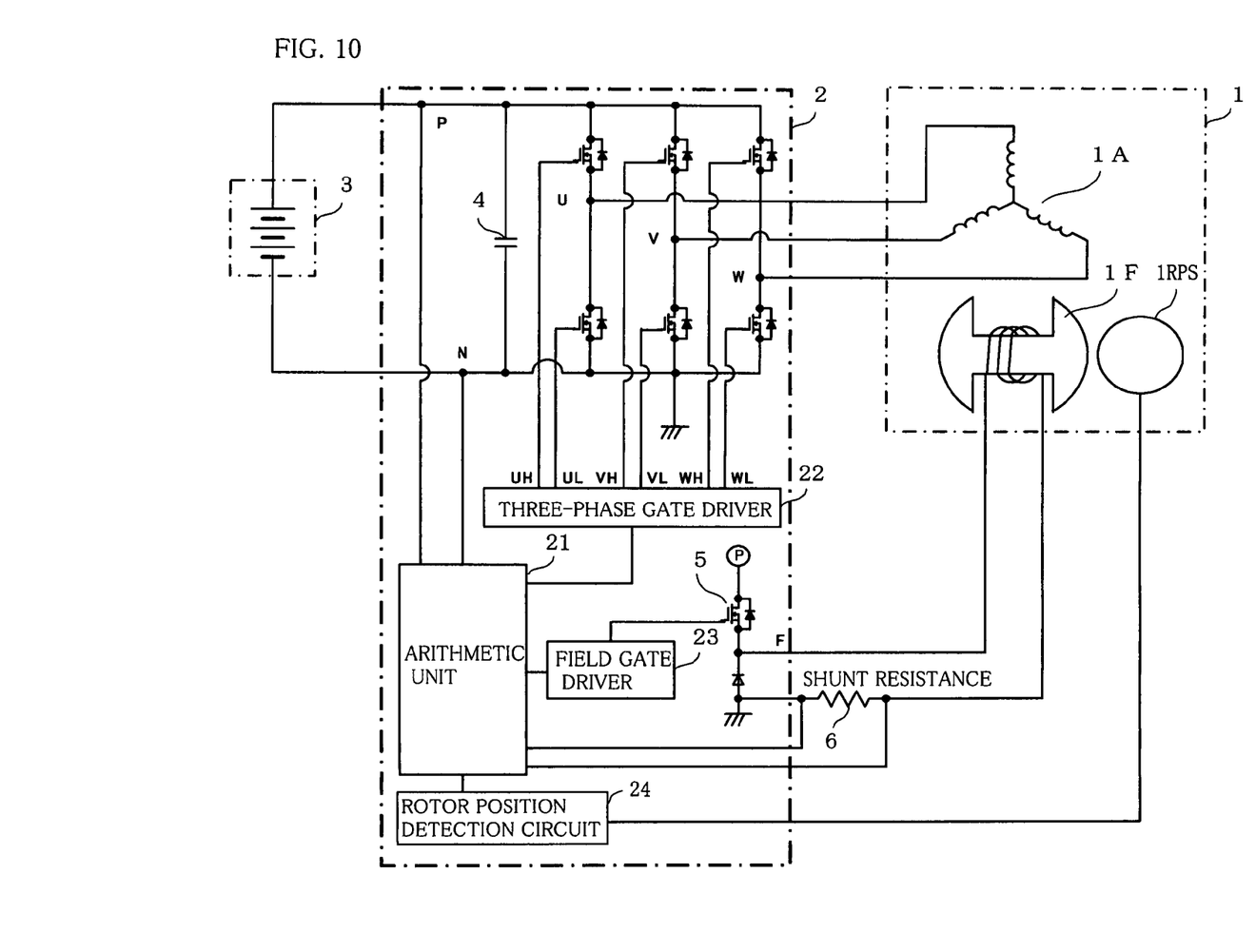
FIG. 10 is a diagram showing an example of field current detection means (a circuit using a shunt resistance), in Embodiment 3 of this invention.

Now, Embodiment 3 of this invention will be described with reference to FIG. 10. In FIG. 10, portions identical or equivalent to those in FIG. 1 are assigned the same numerals and signs as in FIG. 1. FIG. 10 shows a circuit which uses a shunt resistance 6 as field current detection means. The resistance $R_{t1}$ of the rotor field winding of a generator-motor changes depending upon temperatures, as indicated by the following formula (Formula 1):

$$R_{t1} = (235+t1)/(235+t0) \cdot R_{t0} \quad \text{(Formula 1)}$$

where
- t1: actual service temperature,
- t0: reference temperature at which $R_{t0}$ has been measured,
- $R_{t0}$: resistance at the reference temperature.

Besides, a field current $I_f$ is determined by the voltage $V_{PN}$ of a power supply, the ON duty ("Duty") of a field switching element 5, and the voltage drop of the resistance $R_{t1}$ of the field winding, etc., as follows:

$$I_f = (V_{PN} \cdot \text{Duty} - V_{drop})/R_{t0} \quad \text{(Formula 2)}$$

where
- $V_{drop}$: voltage drop of a brush.

The temperature as in the second embodiment affects the field current. Accordingly, when a conduction start angle is changed by the detected field current instead of the temperature, a torque can be controlled to the maximum torque or a target torque at each temperature.

Embodiment 4

Figure 11:
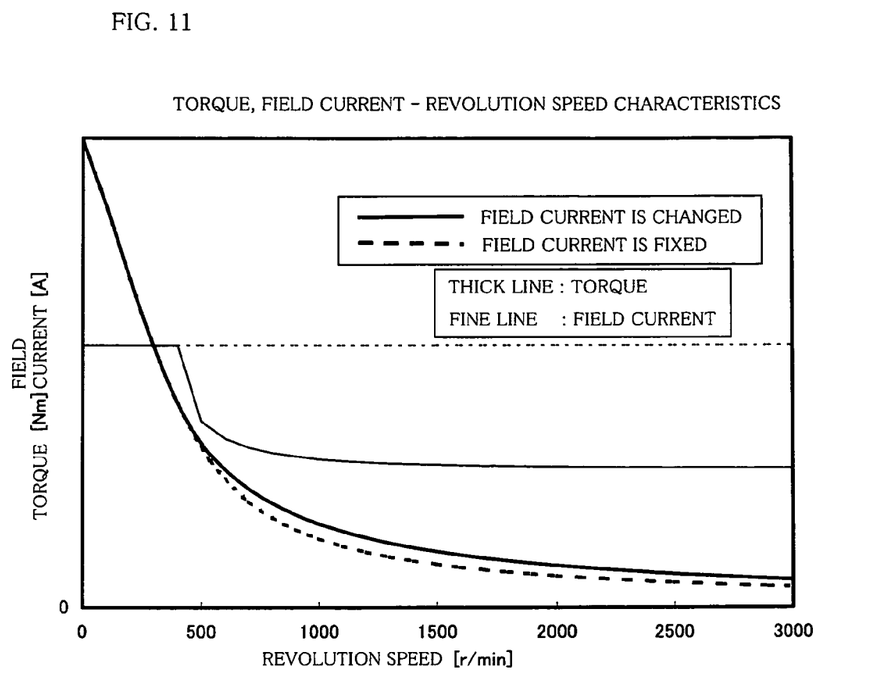
FIG. 11 is a diagram showing examples of the effect of weakening a field current, in Embodiment 4 of this invention.

Now, Embodiment 4 of this invention will be described with reference to FIG. 11. FIG. 11 shows a torque characteristic in the case where a field current is changed versus a revolution speed. As seen from FIG. 11, at high speed revolutions, a torque becomes larger by decreasing the field current more.

Embodiment 5

Figure 12:
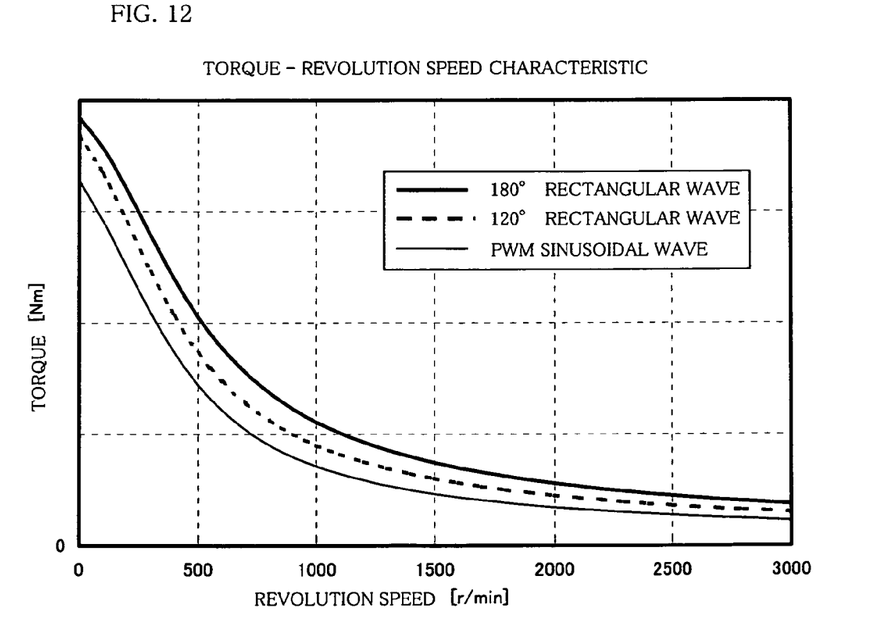
FIG. 12 is a diagram showing examples of the comparisons of the torque characteristics of PWM sinusoidal wave drive and rectangular wave drives, in Embodiment 5 of this invention.

Now, Embodiment 5 of this invention will be described with reference to FIG. 12. FIG. 12 shows the comparisons of the torque characteristics of PWM sinusoidal wave conduction, 120° rectangular wave conduction and 180° rectangular wave conduction. As seen from FIG. 12, the torque of the 120° rectangular wave conduction is larger, and that of the 180° rectangular wave conduction is still larger, when compared with that of the PWM sinusoidal wave conduction. The torque characteristics of the PWM sinusoidal wave conduction, 120° rectangular wave conduction and 180° rectangular wave conduction are the characteristics in the case where the U-phase conduction start angle is continuously changed as shown in FIG. 5.

Embodiment 6

Figure 13:
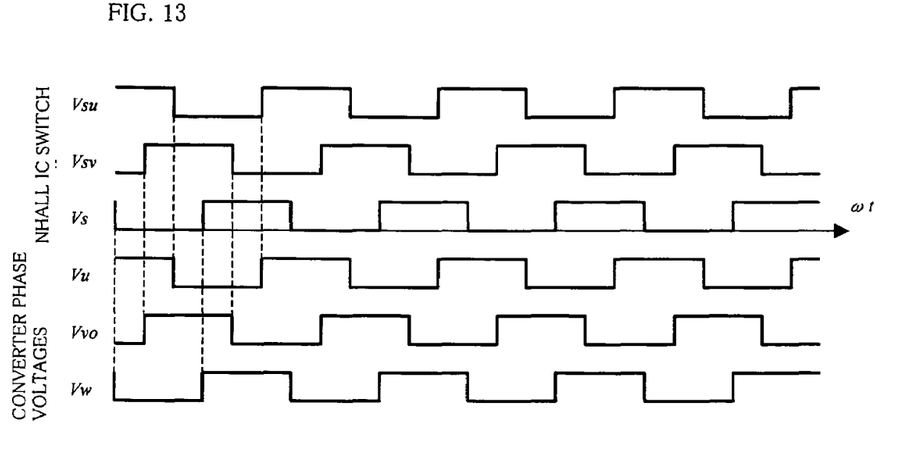
FIG. 13 is a diagram showing examples of position sensor waveforms based on a Hall IC switch and the rectangular wave voltage waveforms of respective phases at a revolution speed near zero, in Embodiment 6 of this invention.
Figure 14:
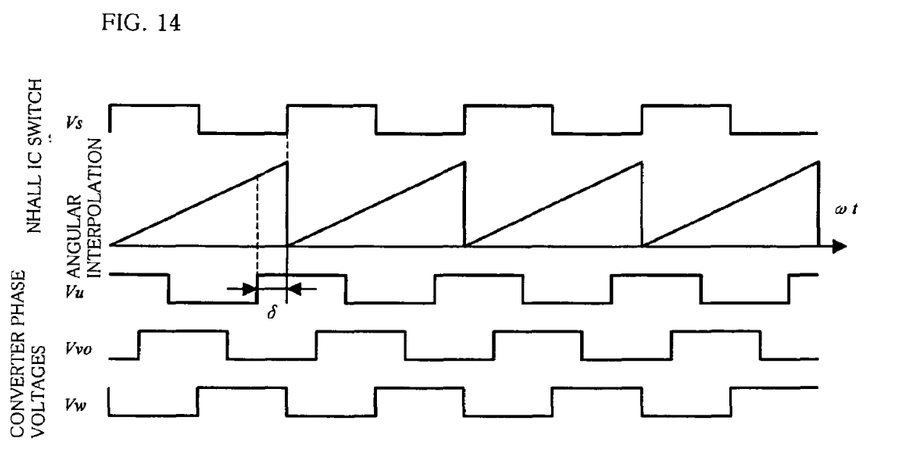
FIG. 14 is a diagram showing examples of position sensor waveforms based on the Hall IC switch and the rectangular wave voltage waveforms of the respective phases at a heightened revolution speed, in Embodiment 6 of this invention.

Now, Embodiment 6 of this invention will be described with reference to FIGS. 13 and 14. FIG. 13 shows the example of claim 13. At a revolution speed near zero, the rectangular wave voltage timings of respective phases are determined by the voltage rectangular waves of a position sensor based on a Hall IC switch. At high speed revolutions, as shown in FIG. 14, the position of a rotor is estimated by evaluating a cycle from the leading edge or trailing edge of the output of the sensor, so as to change the U-phase conduction start angles.

Embodiment 7

Figure 15:
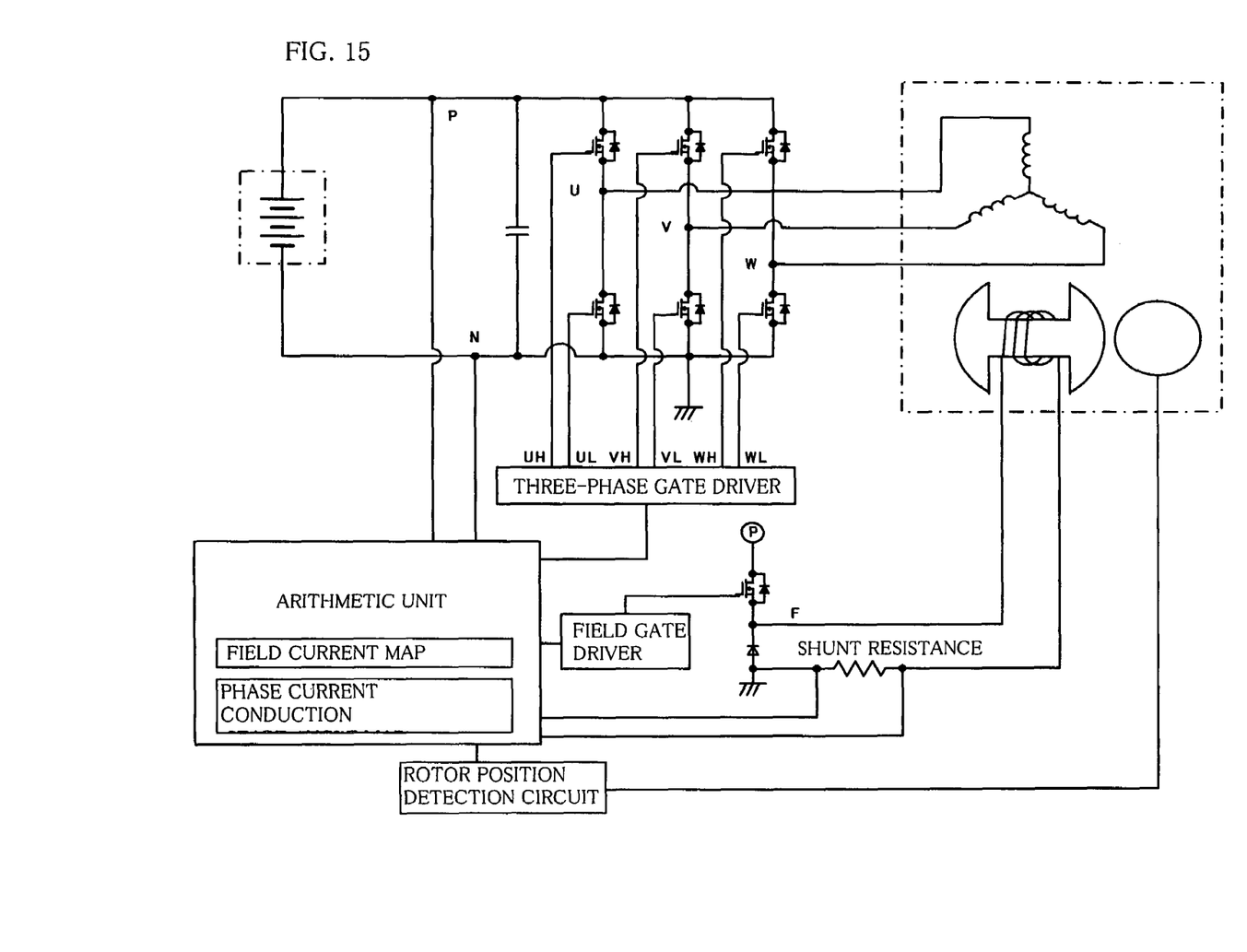
FIG. 15 is a circuit diagram showing examples of a winding field type salient-pole generator-motor and a DC-AC converter in Embodiment 7 of this invention.

Now, Embodiment 7 of this invention will be described with reference to FIGS. 15 and 16. FIG. 15 shows the circuit diagram of the example of claim 3. An arithmetic unit senses a field current by a shunt resistance being field current detection means, it senses a P-N terminal voltage being the input voltage of a DC-AC converter, and it detects the data of a duty in terms of the ON-time ratio of the ON/OFF control of a field gate driver. A field resistance $R_f$ is computed from the field current If, and a voltage $V_f$ which is computed from the product between the P-N terminal voltage $V_{PN}$ and the field ON-duty "Duty", by the following formula:

$$R_f = \frac{V_f}{I_f} = \frac{V_{PN} \cdot \text{Duty} - V_{brush}}{I_f} \quad \text{(Formula 3)}$$

Besides, the temperature $T_f$ of the field coil is computed by the following formula where the resistance of the field coil at 20° C. is represented by $R_{20}$:

$$T_f = 255 \times \frac{R_f}{R_{20}} - 235 \quad \text{(Formula 4)}$$

Figure 16:
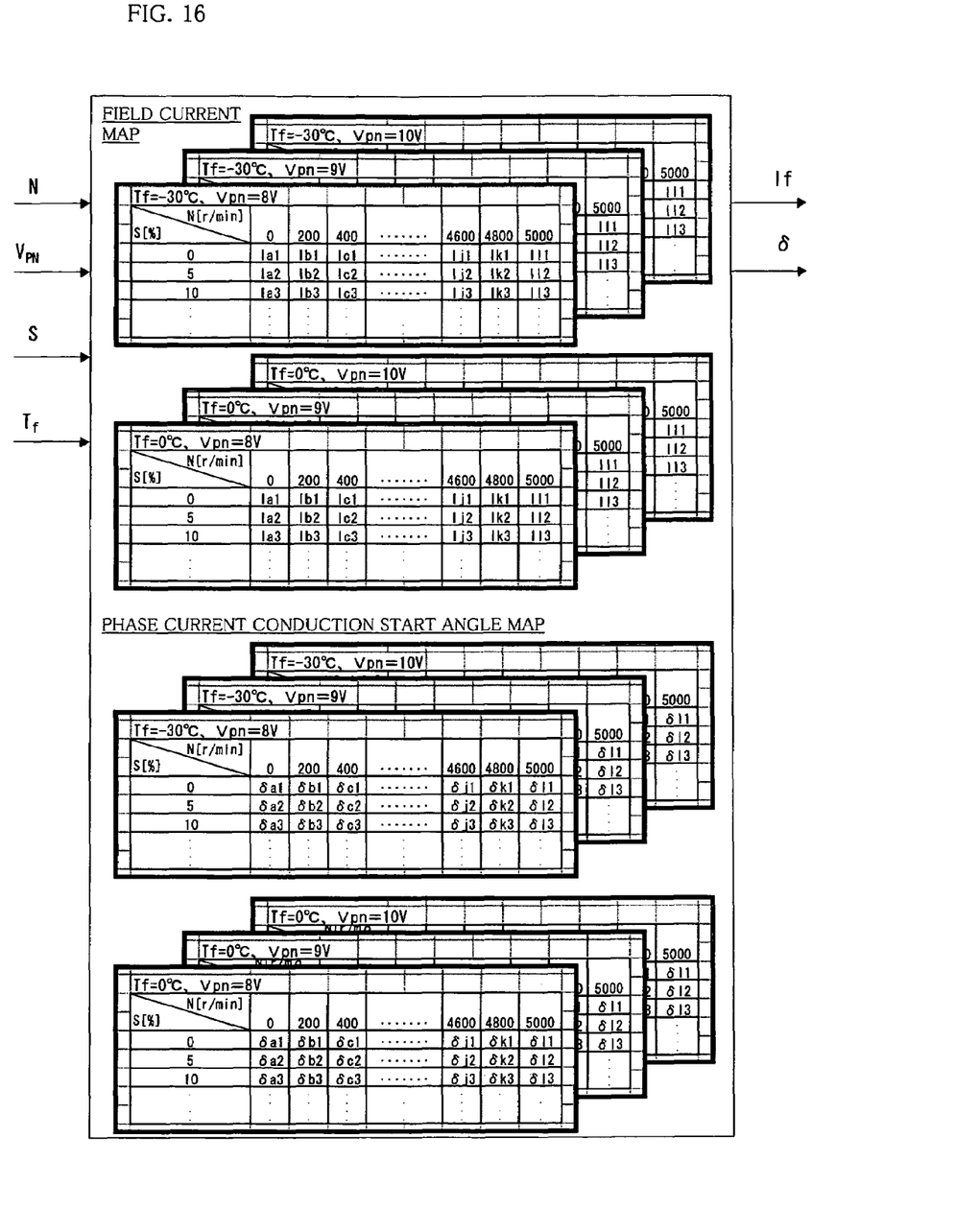
FIG. 16 is a diagram showing examples of methods for determining a field current and a phase current conduction start angle, in Embodiment 7 of this invention.

As shown in FIG. 16, a phase current conduction start angle and the field current are determined by referring to maps based on the above data. Besides, the field resistance $R_f$ may well be used instead of the temperature $T_f$ of the field coil.

Essential points which are mentioned in Embodiments 1-7 of this invention as stated before, and essential points which are not mentioned in Embodiments 1-7 of this invention as stated before are as described below.

1. A vehicular generator-motor control apparatus wherein a winding field type salient-pole generator-motor for a vehicle is subjected to a conduction control by a DC-AC converter, comprising means for energizing a stator of the vehicular winding field type salient-pole generator-motor by rectangular wave voltages at those conduction start angles of respective phases of the stator which are shifted a predetermined angle relative to a rotor position, wherein the conduction start angles of the respective phases change substantially continuously in accordance with an input voltage of the DC-AC converter and a revolution speed of the generator-motor. Besides, a DC-AC converter wherein currents are inputted to and outputted from a winding field type salient-pole generator-motor for a vehicle, in which phase voltages are controlled by rectangular wave voltage conductions of predetermined angular width, conduction start angles of respective phases of a stator are controlled (determined) so as to shift a predetermined angle relative to a rotor position detected by rotor position detection means, and the conduction start angles of the respective phases are controlled so as to change substantially continuously in accordance with an input voltage of the DC-AC converter and a revolution speed of the generator-motor. Thus, the following advantages are brought forth:

(1) Owing to the rectangular wave conduction different from PWM sinusoidal wave conduction, the input voltage can be utilized to the utmost, and a torque is enhanced.

(2) The conduction start phases are shifted the predetermined angle relative to the rotor position, and they are continuously changed with respect to the revolution speed and the input voltage, whereby the torque can be controlled so as to become a predetermined value at each input voltage and each revolution speed.

(3) Also, the conduction start angles can be controlled so as to maximize the efficiency of the motor.

(4) Since PWM switching is not used, the capacitance of a smoothing capacitor for suppressing the surge voltage of an input line can be decreased, and the DC-AC converter can be reduced in size and in cost.

(5) Since the PWM switching is not used, the switching loss of the DC-AC converter can be decreased, and the efficiency thereof can be heightened.

(6) Owing to the salient-pole generator-motor, a reluctance torque is generated by shifting the conduction start angles of the respective phases of the stator relative to the rotor position, and the torque can be enhanced.

2. A vehicular generator-motor control apparatus as defined in the above item 1, wherein the conduction start angles of the respective phases change depending upon a detected temperature. A vehicular generator-motor control apparatus as defined in the above item 1, wherein the DC-AC converter includes temperature detection means, and the conduction start angles of the respective phases are changed depending upon temperatures. Thus, the following advantage is brought forth:

(1) Since the optimum conduction start angle changes depending upon temperatures, the torque is enhanced by changing the conduction start phase in accordance with the detected temperature.

3. A vehicular generator-motor control apparatus as defined in the above item 1, wherein the conduction start angles of the respective phases change depending upon the input voltage of the DC-AC converter, a field current, and a duty of a field chopper. Besides, a vehicular generator-motor control apparatus as defined in the above item 1, wherein the DC-AC converter includes field current detection means, and the conduction start angles of the respective phases are changed depending upon the input voltage of the DC-AC converter, a field current, and a duty of a field chopper. Thus, the following advantage is brought forth:

(1) The optimum conduction start angle changes depending upon temperatures, and the field current changes depending upon the input voltage of the DC-AC converter, the duty and the temperature, so that the torque is enhanced by changing the conduction start phase in dependency on these quantities.

4. A vehicular generator-motor control apparatus as defined in any of the above items 1-3, wherein field weakening is performed by changing a current of a winding field in accordance with the input voltage of the DC-AC converter and the revolution speed of the generator-motor. Thus, the following advantages are brought forth:

(1) The field weakening is performed by the field current, whereby the reaction voltage of the stator can be suppressed, and a stator current can be increased, so that the torque is enhanced.

(2) Besides, a field copper loss can be decreased by decreasing the field current, so that an efficiency is enhanced more than in the field weakening based on the stator current.

(3) Further, since the stator current and the field current of a rotor are controlled, a versatility increases, and running of still higher efficiency is permitted.

5. A vehicular generator-motor control apparatus as defined in any of the above items 1-4, wherein a conduction width of phase voltages of the respective phases of the stator is 180°. Thus, the following advantage is brought forth:

(1) Owing to 180° rectangular wave conduction, the voltages can be utilized to the utmost, and the torque can be enhanced.

6. A vehicular generator-motor control apparatus as defined in any of the above items 1-4, wherein a conduction width of phase voltages of the respective phases of the stator is 120°. Thus, the following advantage is brought forth:

(1) In a case where the current is excessively large with the 180° rectangular wave conduction, it can be suppressed by 120° rectangular wave conduction, and the temperature rise of the DC-AC converter and the degradation of power elements can be prevented.

7. A vehicular generator-motor control apparatus as defined in any of the above items 1-6, wherein the conduction start angles of the respective phases change so as to maximize the torque which is determined every revolution number. A vehicular generator-motor control apparatus as defined in any of the above items 1-6, wherein the conduction start angles of the respective phases are controlled so as to maximize the torque every revolution number. Thus, the following advantage is brought forth:

(1) Since the conduction start angles are controlled so as to maximize the torque, the capability of the motor can be used to the utmost, and the motor can be quickly rotated up to high speed revolutions.

8. A vehicular generator-motor control apparatus as defined in any of the above items 1-7, wherein fundamental waves of the phase voltages and fundamental waves of phase currents are controlled so that power factors may become substantially one. A vehicular generator-motor control apparatus as defined in any of the above items 1-7, wherein fundamental waves of the phase voltages and fundamental waves of phase currents are controlled so that power factors may become approximately one. Thus, the following advantages are brought forth:

(1) Since the torque becomes substantially the maximum at the power factor of one, this power factor of one is utilized as means for determining the rectangular wave voltage phases of the stator, whereby the voltage phases can be controlled by the same algorithm irrespective of the input voltage of the DC-AC converter and the revolution speed of the generator-motor.

(2) Since the phases of the stator phase voltages can be determined by the current phases of the stator, they can be controlled irrespective of the winding specifications of the generator-motor, and the specifications and states of various generator-motors can be coped with.

9. A vehicular generator-motor control apparatus as defined in any of the above items 1-7, wherein a control is performed in a direction of decreasing a loss of a whole system. A vehicular generator-motor control apparatus as defined in any of the above items 1-7, wherein a control is performed so as to minimize a loss of a whole system. Thus, the following advantage is brought forth:

(1) In a case where the torque is not required up to the maximum, the loss is minimized in consideration of temperatures, etc. of a battery and wiring, the DC-AC converter, the generator-motor, etc., so that energy is not consumed wastefully, and an efficiency can be enhanced.

10. A vehicular generator-motor control apparatus as defined in any of the above items 1-9, wherein the rotor position is detected by a well-known resolver. A vehicular generator-motor control apparatus as defined in any of the above items 1-9, wherein rotor position detection means is a well-known resolver. Thus, the following advantages are brought forth:

(1) The resolver can detect the position at a high precision, the resolution of the conduction start angle is enhanced, and the phase can be finely controlled, so that characteristics are enhanced.

(2) Since the control apparatus uses a winding and a magnetic circuit and is structurally simple, it is usable even at high temperatures. It is comparatively inexpensive, and is stout.

11. A vehicular generator-motor control apparatus as defined in any of the above items 1-9, wherein the rotor position is detected by an encoder. A vehicular generator-motor control apparatus as defined in any of the above items 1-9, wherein rotor position detection means is an encoder. Thus, the following advantage is brought forth:
(1) The encoder can detect the position at a higher precision than the resolver, and the resolution of the conduction start angle is enhanced to enhance the torque and the efficiency.

12. A vehicular generator-motor control apparatus as defined in any of the above items 1-9, wherein detection means for the rotor position calculates the revolution speed from a cycle of a rectangular wave-shaped signal waveform of the detected rotor position, and it executes an interpolation of the rotor position for rotor position information items obtained from a combination of a plurality of rectangular waves, so as to use the rotor position of enhanced resolution. A vehicular generator-motor control apparatus as defined in any of the above items 1-9, wherein rotor position detection means calculates the revolution speed from a cycle of a rectangular wave-shaped signal waveform of the rotor position detected by an element such as Hall IC switch, and it executes an interpolation of the rotor position for rotor position information items obtained from a combination of a plurality of rectangular waves, so as to use the rotor position of enhanced resolution. Thus, the following advantages are brought forth:
(1) The Hall switch is less expensive than the resolver.
(2) Owing to the interpolation of the rotor position, a rotor position precision can be enhanced, so that the torque and the efficiency can be enhanced.

13. A vehicular generator-motor control apparatus as defined in the above item 12, wherein in a case where a revolution speed of a rotor is zero, a stator voltage is subjected to a rectangular wave control in synchronism with a leading edge or a trailing edge of the rectangular wave-shaped signal waveform without executing the angular interpolation of the rotor position, and the detection means for the rotor position is adjusted so as to maximize the torque on this occasion. A vehicular generator-motor control apparatus as defined in the above item 12, wherein regarding the rectangular wave-shaped signal waveform of the rotor position detected by the element such as Hall IC switch, in a case where a revolution speed of a rotor is zero, a stator voltage is subjected to a rectangular wave control in synchronism with a leading edge or a trailing edge of the rectangular wave-shaped signal waveform without executing the angular interpolation of the rotor position, and the revolution detection means is adjusted so as to maximize the torque on this occasion. Thus, the following advantages are brought forth:
(1) The angular interpolation of the rotor position is impossible at the zero revolution speed, but drive is possible without the angular interpolation.
(2) When the revolution speed is zero, the detection means is set so as to afford the maximum torque, without executing the angular interpolation, so that the capability of the motor can be utilized to the utmost.

Various modifications and alterations of this invention will be apparent to those skilled in the art without departing from the scope and spirit of this invention, and it should be understood that this is not limited to the illustrative embodiments set forth herein.

The invention claimed is:

1. A vehicular generator-motor control apparatus wherein a winding field type salient-pole generator-motor for a vehicle is subjected to a conduction control by a DC-AC converter, comprising:
detection means for detecting a position of a rotor; and
means for energizing a stator of the vehicular winding field type salient-pole generator-motor by applying rectangular wave voltages to the winding field type salient-pole generator-motor at conduction start angles of respective phases of the stator, wherein the conduction start angles are shifted by a predetermined angle relative to the position of the rotor detected by the detection means, and the conduction start angles of the respective phases change substantially continuously in accordance with an input voltage of the DC-AC converter and a revolution speed of the winding field type salient-pole generator-motor.

2. A vehicular generator-motor control apparatus as defined in claim 1, wherein the conduction start angles of the respective phases change depending upon a detected temperature of a stator coil of the stator.

3. A vehicular generator-motor control apparatus as defined in claim 1, wherein the conduction start angles of the respective phases change depending upon the input voltage of the DC-AC converter, a field current, and a duty of a field chopper.

4. The vehicular generator-motor control apparatus according to claim 3, wherein the field current changes in accordance with the input voltage of the DC-AC converter and the duty of the field chopper, and the means for energizing controls a torque of the winding field type salient-pole generator-motor by controlling a value of the field current.

5. The vehicular generator-motor control apparatus according to claim 3, wherein the field current is calculated with the following equation:

$$I_f = (V_{PN} \cdot \text{Duty} - V_{drop})/R_{t0},$$

wherein $I_f$ is the field current, $V_{PN}$ is a voltage of a power supply, Duty is an ON duty of a field switching element, $V_{drop}$ is a voltage drop of a brush, and $R_{t0}$ is a resistance at a reference temperature t0.

6. A vehicular generator-motor control apparatus as defined in claim 1, wherein a conduction width of phase voltages of the respective phases of the stator is 180°.

7. A vehicular generator-motor control apparatus as defined in claim 1, wherein a conduction width of phase voltages of the respective phases of the stator is 120°.

8. A vehicular generator-motor control apparatus as defined in claim 1, wherein the conduction start angles of the respective phases change so as to maximize a torque of the winding field type salient-pole generator-motor which is determined every revolution of the rotor.

9. A vehicular generator-motor control apparatus as defined in claim 1, wherein fundamental waves of phase voltages of the respective phases and fundamental waves of phase currents of the respective phases are controlled so that power factors may become substantially one.

10. The vehicular generator-motor control apparatus according to claim 9, wherein the means for energizing utilizes the power factors for determining the rectangular wave voltages to be applied to the winding field type salient-pole generator.

11. A vehicular generator-motor control apparatus as defined in claim 1, wherein the means for energizing performs a control in a direction of decreasing a power loss of the vehicular generator-motor control apparatus.

12. A vehicular generator-motor control apparatus as defined in claim 1, wherein the detection means is a resolver.

13. A vehicular generator-motor control apparatus as defined in claim 1, wherein the detection means is an encoder.

14. A vehicular generator-motor control apparatus as defined in claim 1, wherein the detection means detects the rotor position by calculating the revolution speed from a cycle of a rectangular wave-shaped signal waveform of the detected rotor position, and executing an interpolation of the rotor position for rotor position information items obtained from a combination of a plurality of rectangular waves among the rectangular wave-shaped signal waveform, so as to use the rotor position information items of enhanced resolution.

15. A vehicular generator-motor control apparatus as defined in claim 14, wherein in a case where a revolution speed of a rotor is zero, a stator voltage is subjected to a rectangular wave control in synchronism with a leading edge or a trailing edge of the rectangular wave-shaped signal waveform without executing the interpolation of the rotor position, and the detection means for the rotor position is adjusted so as to maximize a torque of the winding field type salient-pole generator-motor.

16. The vehicular generator-motor control apparatus according to claim 1, wherein the rectangular wave voltages have a predetermined angular width, and the conduction start angles of the respective phases are shifted by the predetermined angle based on the predetermined angular width of the rectangular wave voltages.

17. The vehicular generator-motor control apparatus according to claim 1, wherein a torque of the winding field type salient-pole generator-motor is set to a desired value based on the input voltage of the DC-AC converter and the revolution speed of the winding field type salient-pole generator-motor.

18. A vehicular generator-motor control apparatus wherein a winding field type salient-pole generator-motor for a vehicle is subjected to a conduction control by a DC-AC converter, comprising:

means for energizing a stator of the vehicular winding field type salient-pole generator-motor by applying rectangular wave voltages to the winding field type salient-pole generator-motor at conduction start angles of respective phases of the stator, wherein the conduction start angles are shifted by a predetermined angle relative to a position of a rotor, and the conduction start angles of the respective phases change substantially continuously in accordance with an input voltage of the DC-AC converter and a revolution speed of the winding field type salient-pole generator-motor; and means for performing field weakening by changing a current of a winding field in accordance with the input voltage of the DC-AC converter and the revolution speed of the winding field type salient-pole generator-motor.

* * * * *